July 4, 1944.  C. D. RYAN ET AL  2,352,802
CONTROL SYSTEM FOR POSTAGE PRINTING MACHINES
Filed Oct. 1, 1941  9 Sheets-Sheet 1
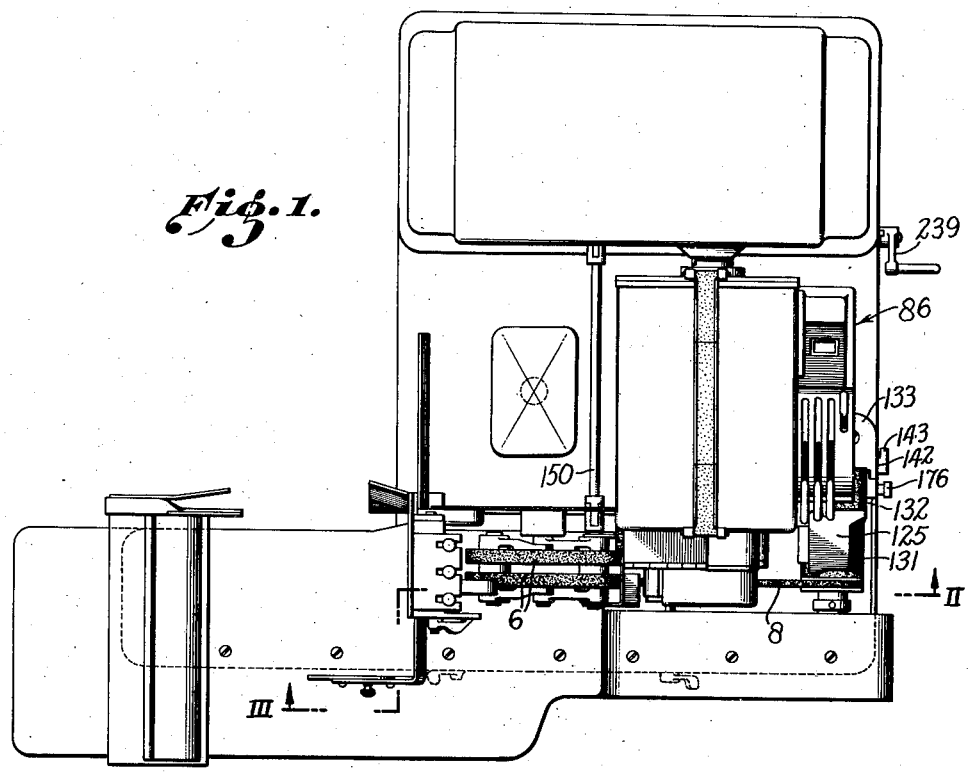
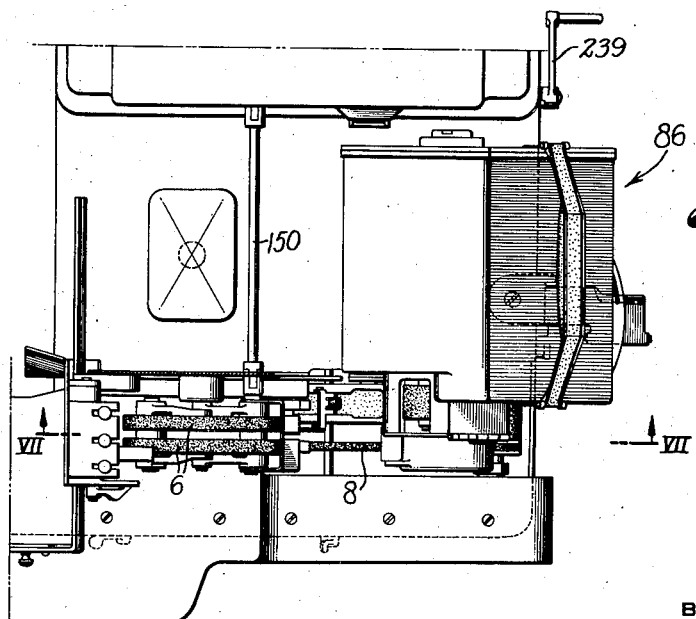
INVENTORS
Commodore D. Ryan
BY Edward P. Drake
Blair, Curtis + Hayward
ATTORNEYS INVENTORS
Commodore D. Ryan
Edward P. Drake
BY Blair, Curtis & Hayward
ATTORNEYS

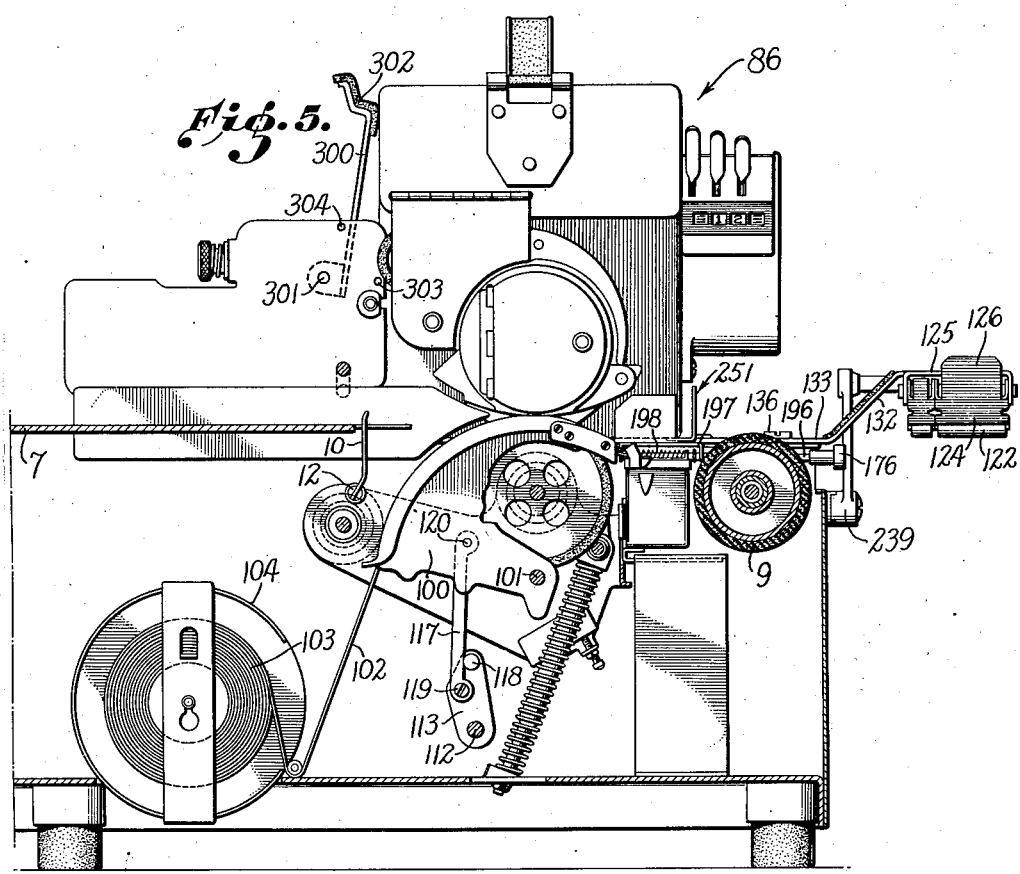
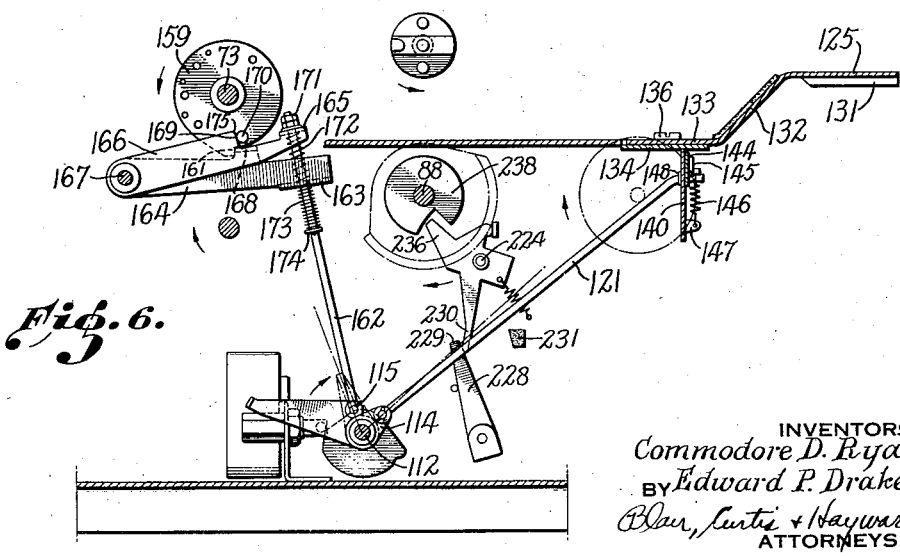

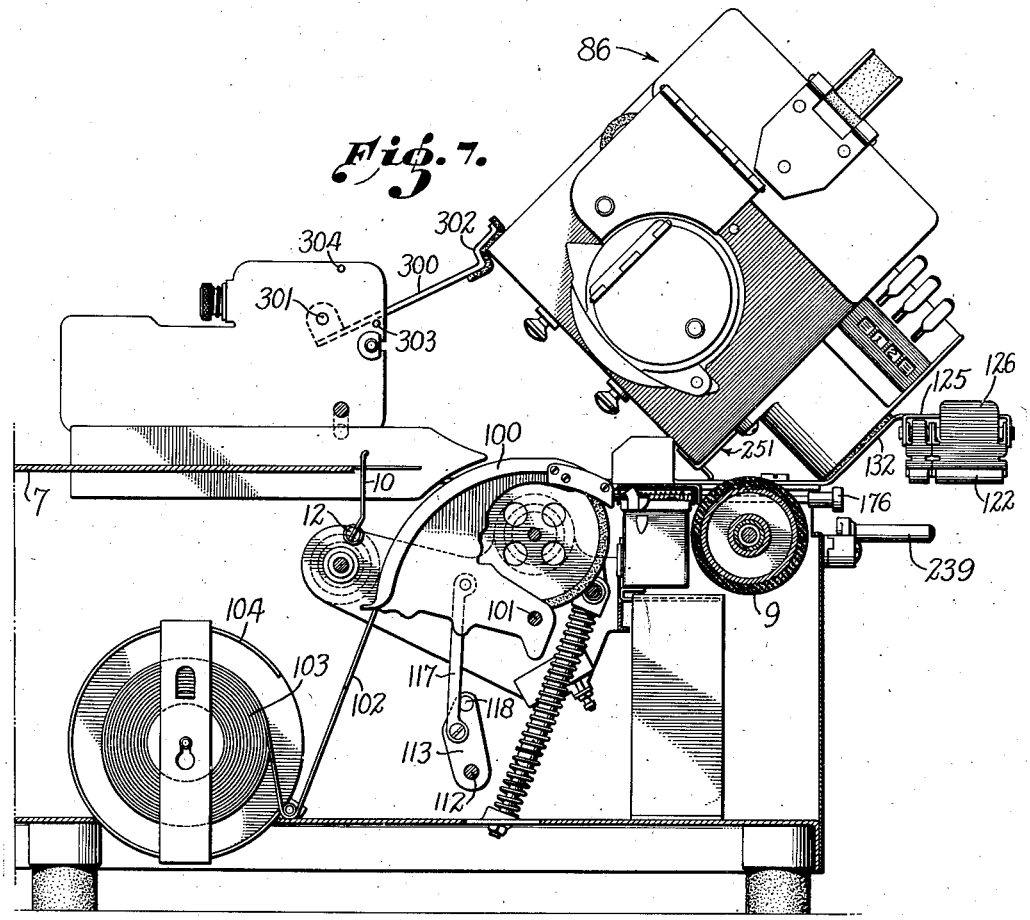
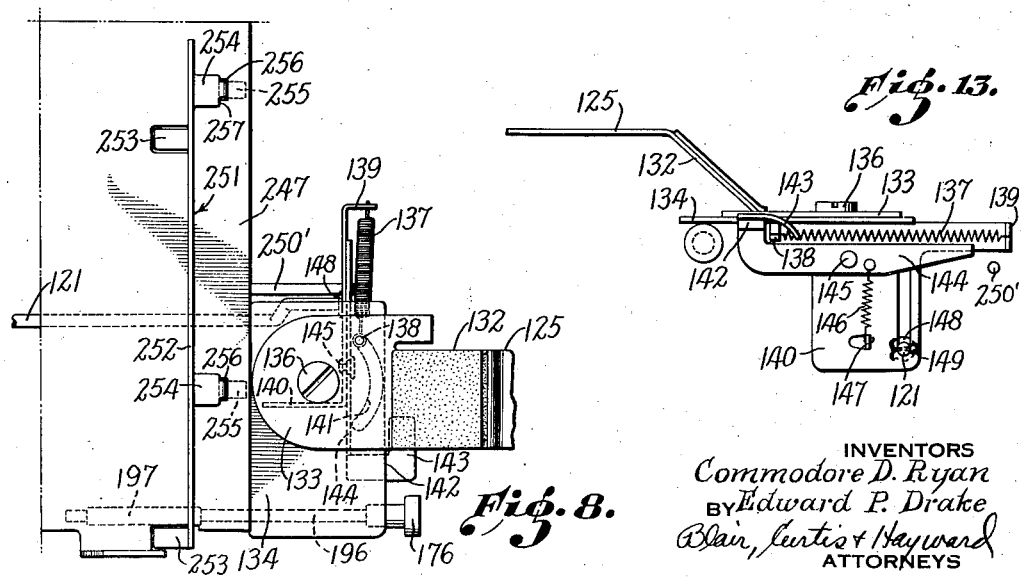

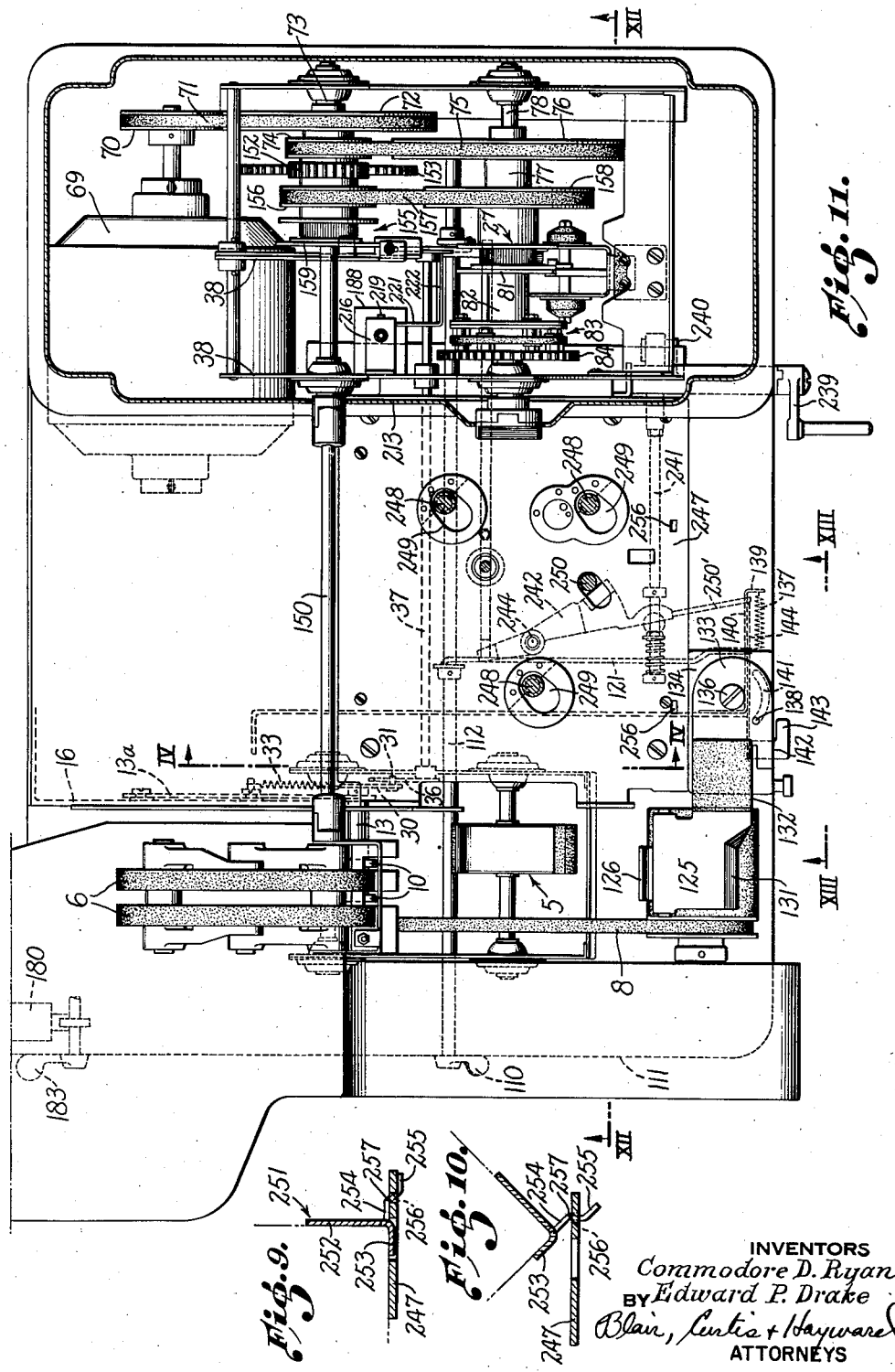

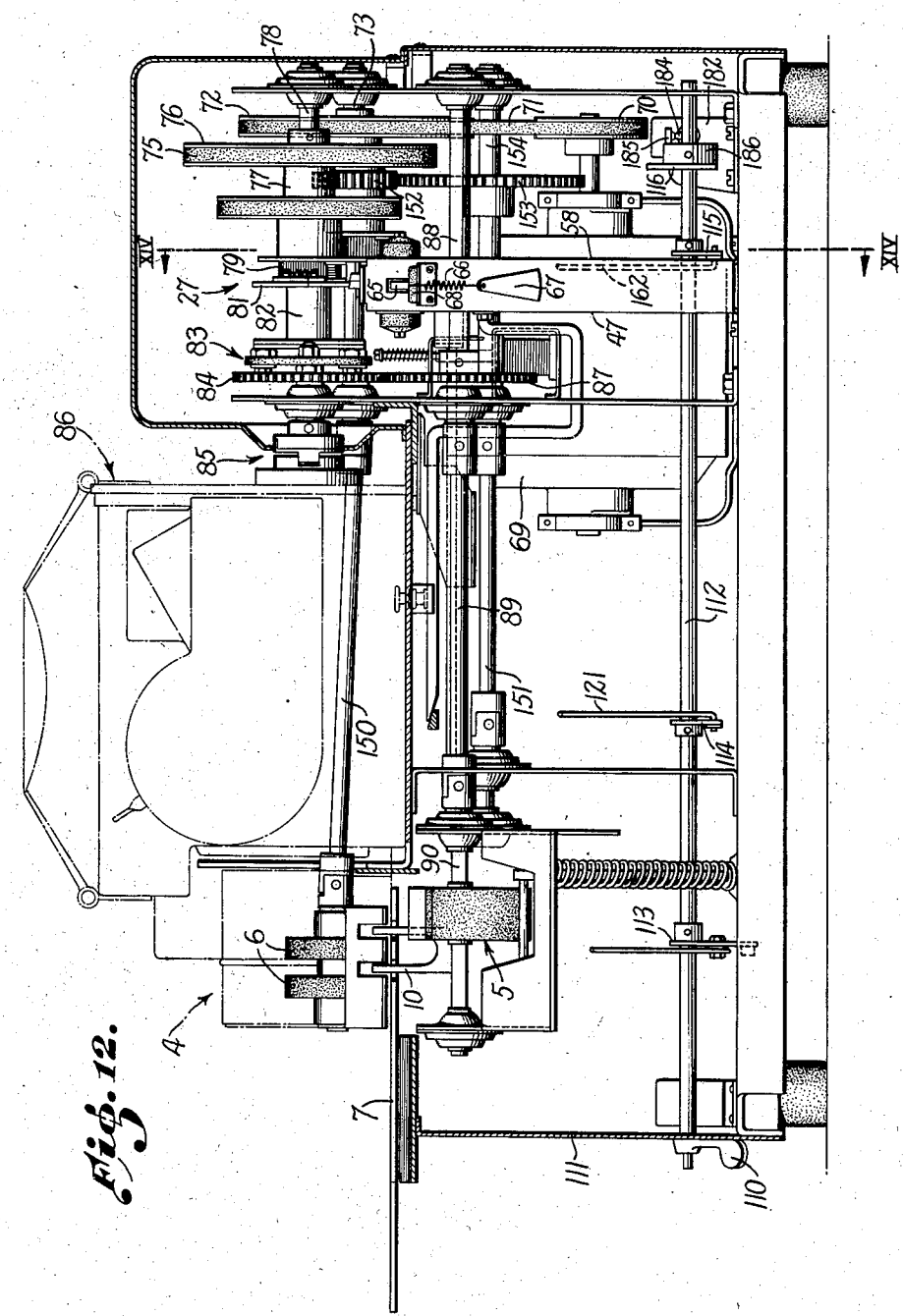

July 4, 1944.   C. D. RYAN ET AL   2,352,802
CONTROL SYSTEM FOR POSTAGE PRINTING MACHINES
Filed Oct. 1, 1941   9 Sheets-Sheet 7

INVENTORS
Commodore D. Ryan
BY Edward P. Drake
Blair, Curtis + Hayward
ATTORNEYS

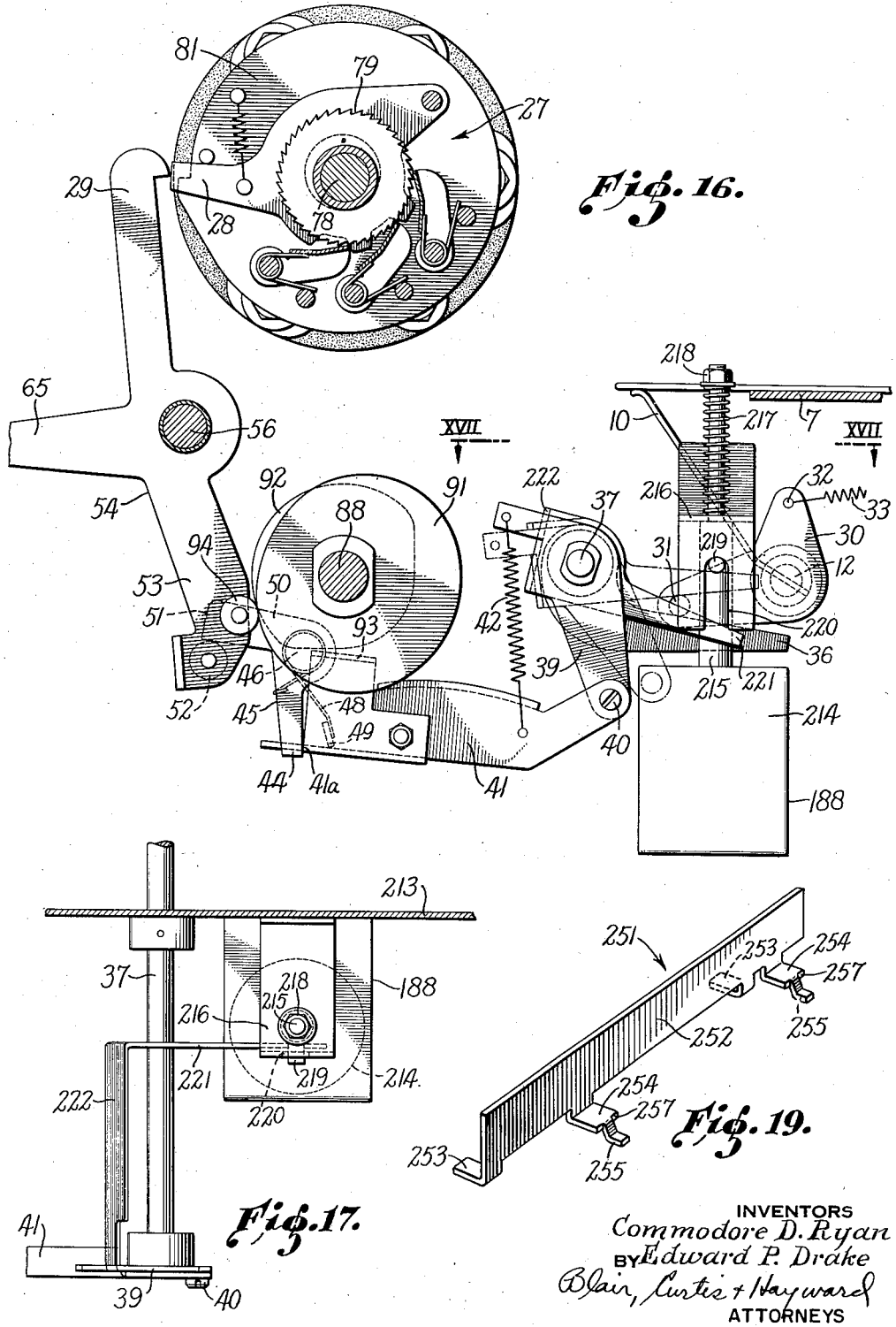
July 4, 1944. C. D. RYAN ET AL 2,352,802
CONTROL SYSTEM FOR POSTAGE PRINTING MACHINES
Filed Oct. 1, 1941 9 Sheets-Sheet 9
INVENTORS
Commodore D. Ryan
Edward P. Drake
ATTORNEYS Patented July 4, 1944

2,352,802

UNITED STATES PATENT OFFICE 2,352,802

CONTROL SYSTEM FOR POSTAGE PRINTING MACHINES

Commodore D. Ryan and Edward P. Drake, Los Angeles, Calif., assignors to National Postal Meter Company, Inc., Rochester, N. Y., a corporation of Delaware Application October 1, 1941, Serial No. 413,121

7 Claims. (Cl. 101—235)

This invention has to do with automatic machines for printing postage, and more particularly to automatic machines adaptable to print postage either on letters and the like, or on tape.

An object of the invention is to provide a simple, reliable, and relatively foolproof control system for a power-operated printing machine adapted to print either on envelopes or on continuous tape, whereby the machine can be readily adjustable for either kind of work.

Another object is to provide a power-operated printing machine for printing postage on continuous tape, in which the power is provided by an electric motor which drives the printing mechanism through a clutch, with a control system for readily adapting the machine either for operation with the motor running continuously, or for operation in which the motor starts and stops for each printing operation.

Another object is to provide a machine for printing postage on either envelopes or tape, and having an ejecting means for use with envelopes but not with tape, in which the control means for converting the machine from condition for printing on envelopes to condition for printing on tape, automatically moves the envelope-ejecting means out of the way.

Another object of the invention is to facilitate the adjustment of a postage meter on a postage printing machine.

Other more specific objects and features of the invention will become apparent from the detailed description to follow of one particular embodiment thereof.

A postage printing machine of the type to which this invention relates comprises a rotatable printing head, incorporated in a postage meter, and a cooperating rotatable platen, both of which are adapted to be rotated by a suitable motor when postage is to be printed. Such a machine includes a hopper and a conveyer system for delivering envelopes one at a time to the printing head and platen, and also incorporates a tape mechanism, which is inactive when the machine is conditioned for stamping envelopes, but which can be swung into operative relation with the platen and printing head when it is desired to print postage on tape, for attachment to objects that cannot be run through the machine.

The machine is operated by an electric motor, which runs continuously and continuously drives the envelope conveyer system when the machine is conditioned for stamping envelopes. The printing head and platen are operated from the motor through a clutch, which, when tripped, actuates the printing head and platen through one cycle and then disconnects them. Hence, for each printing operation, the clutch must be tripped. This tripping is accomplished, when printing on envelopes, by a trigger placed in the path of the envelopes as they approach the printing head. When the machine is conditioned for printing on tape, the clutch is engaged by manual depression of a push button for each printing operation. When it is desired to only occasionally print a stamp on tape, it is desirable to automatically start and stop the electric motor for each stamping operation. On the other hand, when a large number of stamps are to be printed on tape, it is desirable to leave the motor running continuously, and merely engage and disengage the clutch for each operation.

Among other things, the present invention has to do with the controls for adapting the machine for either envelope or tape operation, and for conditioning it for tape operation either with the motor running continuously or with the motor running intermittently. We provide two control handles for performing these functions, in addition to the letter trigger and the push button, previously mentioned. One of the control handles is a shifting arm for converting the machine from envelope to tape operation, or vice versa, and has a "letter" position and a "tape" position. When moved into "letter" position, the shifting arm shifts the tape mechanism out of the way and disables a first energizing circuit for the electric motor. The other control is a starting handle movable between an "off" and an "on" position, in the first of which it opens, and in the second of which it closes, a second energizing circuit for the motor. The first energizing circuit is only partially completed by moving the shifting arm into "tape" position. This circuit includes a second switch which must also be closed to complete the circuit, which second switch is actuated in response to engagement of the clutch by the push button. Therefore, with the starting handle in "off" position and the shift lever in "tape" position, the motor starts and stops for each stamping operation initiated by depression of the push button. However, the motor can be operated continuously for tape operation by throwing the shifting arm into "tape" position, and also throwing the starting handle into "on" position, the starting handle closing the second energizing circuit for the motor, and the shifting arm disabling the envelope conveyer system, which runs continuously when the machine is adjusted for stamping envelopes.

In postage printing machines of this type, the postage meter is relatively heavy. Furthermore, it is necessary to shift the meter upwardly to carry the printing head thereon clear of the rest of the mechanism to perform certain adjusting operations on the meter. In accordance with the present invention, we make it easier to shift the meter into adjusting position by providing a swinging bracket that pivotally supports the meter for swinging movement into an elevated position, in which the meter lies against a rest; the hinge line of the bracket is so positioned, by a special construction thereof, as to insure that the meter will be in a position of stable equilibrium when lying against said rest. In order to shift the meter into the elevated, inspection position, it must be unlocked from the rest of the machine, and this unlocking operation is performed by swinging a lever. In accordance with the present invention, we simplify the general construction of the machine, and facilitate its operation, by incorporating the meter rest on a swinging bracket that also supports an ejector mechanism for use with envelopes. By this arrangement, the moving of the meter-locking lever to unlock the meter automatically swings the meter rest and envelope ejector assembly from envelope-ejecting position to meter-supporting position.

Referring to the drawings

Fig. 1 is a plan view of a complete postage printing machine incorporating the present invention, in condition for printing postage on envelopes;

Fig. 2 is a plan view showing a portion of the machine with the postage meter tilted into adjusting position;

Fig. 5 is a view similar to Fig. 3, with certain parts eliminated, and with the machine adjusted to print on tape, instead of on envelopes;

Fig. 6 is a view similar to Fig. 4, but with the machine adjusted for "tape" operation;

Fig. 7 is a view similar to Fig. 5, but showing the meter tilted into adjusting position;

Fig. 8 is a detail, plan view of a portion of the machine, with certain parts omitted, showing details of the bracket supporting the pressure roller of the machine;

Fig. 9 is a detail, vertical section of the bracket supporting the postage meter for tilting movement;

Fig. 10 is a view similar to Fig. 9, but showing the bracket in tilted position;

Fig. 11 is a horizontal section through the entire machine, the plane of the section being taken between the bottom wall of the meter and the bed on which it rests;

Fig. 12 is a longitudinal section of the machine taken substantially along the line XII—XII of Fig. 11;

Fig. 13 is a detail elevation of the swinging bracket shown in plan in Fig. 8, the elevation being taken looking from right to left in Fig. 8;

Fig. 16 is an enlarged detail view of a portion of the apparatus shown in Fig. 15, with the machine in a different phase of operation than that shown in Fig. 15;

Fig. 17 is a detail, horizontal section taken substantially in the plane XVII—XVII of Fig. 16;

Fig. 19 is an enlarged perspective view of a bracket for supporting the meter.

The following is a description of certain features of the postage printing machine shown in Figure 1, namely the control system in the machine for adjusting the machine or for printing postage on envelopes or tape. Other aspects of this machine are particularly described in certain copending applications, as follows:

Commodore D. Ryan and Edward P. Drake, Serial No. 399,324, filed June 23, 1941, which is directed to the envelope trip and the mechanism controlled thereby.

Commodore D. Ryan, Serial No. 388,770, filed April 16, 1941, which is directed to apparatus for the handling of envelopes and the like.

Commodore D. Ryan, Serial No. 363,257, filed October 29, 1940, which is directed to mechanism which feeds envelopes and the like one at a time into the mail treating machine for treatment thereof.

Commodore D. Ryan and Edward P. Drake, Serial No. 413,120, filed October 1, 1941, which is directed primarily to the conveyor system of the mail treating machine.

Commodore D. Ryan and Edward P. Drake, Serial No. 413,122, filed October 1, 1941, which is directed to the envelope guiding, and a part of the envelope feeding mechanism of the mail treating machine.

GENERAL CONSTRUCTION

The postage printing machine in which the present inventions are incorporated, includes as important elements a hopper 1 (Fig. 3) for containing a stack of objects to be stamped, such as envelopes; a stripper and conveying mechanism 2 for removing envelopes from the hopper 1, one at a time, and moving them toward a printing mechanism, and the printing mechanism, which includes a printing head 4 positioned above the path of travel of the envelopes, and a cooperating platen 5 positioned below the printing head.

Figure 3:
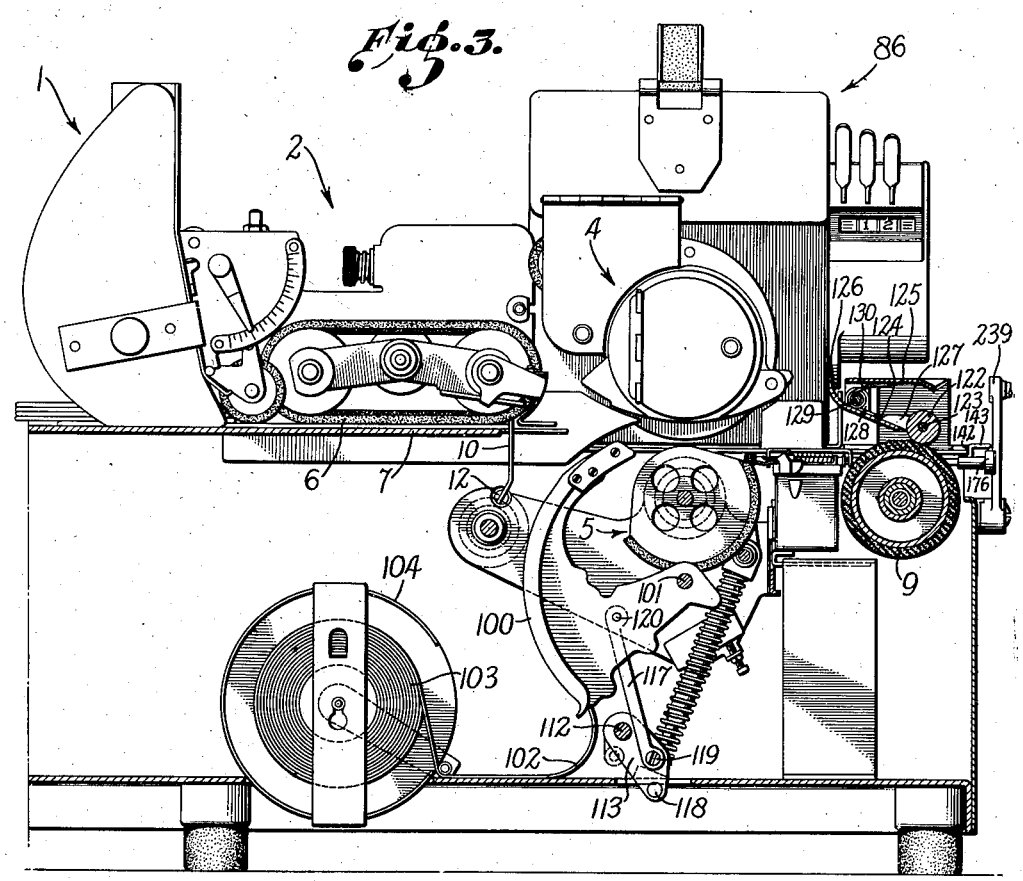
Fig. 3 is a vertical section looking from front to rear of the machine, the section being taken approximately along the line III—III of Fig. 1, and certain details being omitted.

The exact construction of the hopper and stripping mechanisms is of no interest in connection with the present invention, and will not be described further. It is only necessary to understand that the envelopes are removed one at a time from the hopper and delivered to conveyer belts 6, which frictionally engage the surface of each envelope and pass it along a table 7. As each envelope is projected along the table 7, it is engaged by an additional conveyer belt 8 (Figs. 1 and 2), which carries it between the printing head 4 and the platen 5 (Fig. 3). Whereas the conveyer belts 6 and 8 operate continuously, the printing head 4 and the platen 5 are normally stationary, but are started automatically in response to delivery of an envelope thereto, are rotated through one revolution to print a stamp on the envelope, and are then stopped pending the delivery of another envelope thereto. As each envelope is discharged from between the printing head 4 and the platen 5, it passes over an ejector roll 9, which ejects it from the machine.

The entire mechanism is driven from a single electric motor 69 (Fig. 12). The manner in which the conveyers are driven from the motor will be described later. The drive from the motor 69 to the printing head and platen will now be traced.

The motor 69 has a pulley 70, coupled by a belt 71 to a pulley 72 on a shaft 73, which shaft carries a smaller pulley 74 (Fig. 11), coupled by a belt 75 to a large pulley 76, secured to a sleeve 77, rotatably mounted on a shaft 78, journaled in the frame members of the machine. The sleeve 77 is coaxial with and is connected to a ratchet wheel 79 of a clutch 27. The ratchet wheel 79 constitutes the driving member of the clutch 27, and the driven member thereof includes a disc 81, which disc is connected by a sleeve 82 and a flexible connection 83 to a gear 84, which is secured to the shaft 78, previously mentioned. This shaft 78 is adapted to be connected at its forward end by a coupling 85 to the coupling of a postage meter 86 (Fig. 12), in which the printing head is incorporated.

The gear 84 meshes with a gear 87 of the same size on a shaft 88, which shaft is connected, by a shaft 89 and suitable universal couplings, with a shaft 90, which carries the platen 5, so that the printing head 4 and the platen 5 rotate at the same speed in opposite directions, when the clutch 27 is engaged.

A complete disclosure of the postage meter corresponding to the meter 86 may be found in the copending application of Sager et al., Serial No. 332,305, filed April 29, 1940, on Mail treating machine. At present it is sufficient to an understanding of the present invention to know that the printing head 4 is directly rotated with the coupling 85.

The details of the clutch 27 do not constitute a part of the present invention, but are disclosed in detail in an application of Commodore D. Ryan, Serial No. 377,418 filed February 5, 1941, on Power-operated printing machines, which application also describes the exact construction of the flexible coupling 83.

It is sufficient for an understanding of the present invention to know that the clutch 27 (Fig. 15) includes an arm 28 normally engaged by a latch 29, under which condition the clutch is disengaged, and the printing head and platen are held stationary in a neutral position. When the latch 29 is rocked out of engagement with the arm 28, the clutch engages automatically, to connect the printing head and platen to the motor for one revolution, at the end of which the latch 29 again engages the arm 28, disengaging the clutch and holding the driven member 81 stationary.

It was previously mentioned that the printing head and platen were started automatically in response to delivery of an envelope thereto. This action is effected by means of a trigger 10 (Fig. 3), in the path of envelopes moving over the table 7, and a mechanism actuated by deflection of the trigger 10 to engage the clutch 27, substantially as disclosed in our application noted above, Serial No. 399,324.

Thus the trigger 10 projects upwardly from a horizontal shaft 12, which extends rearwardly through a supporting journal 13 supported on a slide 13a supported on the wall 16 (Fig. 11) of the machine. Secured to the rear end of the trigger shaft 12 is a bellcrank 30 (Fig. 16) having on one arm a pin 31 and having in the other arm a hole 32. A tension spring 33 hooks in the hole 32 and urges the bellcrank 30 counterclockwise (as viewed from the front of the machine) into a neutral position, in which the trigger 10 is substantially vertical. With the trigger assembly in neutral position, the pin 31 lies above an arm 36 on a shaft 37, which shaft extends rearwardly through frame members 38 (Fig. 11), in which it is journaled, and has secured to its rear end a bellcrank 39 (Fig. 16), one arm of which is pivotally connected by a pivot 40 to the right end of a link 41. A tension spring 42, connected between the other arm of the bellcrank 39 and the link 41, tends to lift the latter at all times.

Rocking of the trigger 10, by an envelope, carries the pin 31 down against the arm 36, rocking the latter downward and rocking the shaft 37 clockwise, with reference to Fig. 16, thereby shifting the link 41 to the left.

Under normal conditions, upward movement of the link 41, in response to the tension of the spring 42, is limited by contact of a follower 93 (Fig. 16), on the link, with a cam 92, so that a shoulder 41a on the left end of the link 41 engages one arm 44 of a bellcrank lever 45 supported by a bolt 46 on a wall 47 (Fig. 15) of a stationary bracket 59. The bellcrank 45 is urged counterclockwise (Fig. 16), by a light torsion spring 48, which normally holds the arm 44 against a stop ear 49 turned out from the wall 47. In Fig. 16, the arm 44 has been carried away from the stop ear 49 by the link 41, but the arm 44 is shown in its neutral position in Fig. 15. The upper arm 50 of the bellcrank 45 cooperates with a roller 52 (Fig. 16) on the lower end of an arm 53 of a three-arm lever 54, another arm of which constitutes the clutch latch 29, previously mentioned. The lever 54 is fulcrumed on a shaft 56, supported at its opposite ends in the side walls 47 and 58 (Fig. 12) of the vertically extending, channel-shaped bracket 47, which in turn is supported from the main frame of the machine.

In addition to the arms 29 and 53 (Fig. 15) the three-arm lever 54 has a third arm 65, which extends substantially horizontally and is urged downwardly by a tension spring 66, connected between the end of the arm and a bent-out portion 67 of the stationary bracket 47. A stop member 68 limits counterclockwise rocking movement of the lever 54 to an angle only sufficient to disengage the latch 29 from the clutch arm 28.

In Fig. 16, the arm 50 of the bellcrank 45 is shown displaced upwardly out of the path of the roller 52, but normally the end 51 of the arm 50 lies in the path of the roller 52 and prevents the lever 54 from being rocked by the spring 66 (Fig. 15) to disengage the latch 29. However, the movement of link 41 to the left, in response to movement of an envelope against the letter trigger, as previously described, rocks the bellcrank 45 clockwise into the position shown in Fig. 16, in which the arm 50 is above the path of the roller 52, whereupon the spring 66 rocks the lever 54 to disengage the latch 29. Thereupon, the clutch 27 is engaged to drive the printing head and platen through a cycle of operation.

The latch 29 is returned, to re-engage the clutch arm 28 at the end of one revolution, by a mechanism power-driven through the clutch 27 itself, and including the cam 92, previously mentioned, and a cam 91, both of which are secured to the shaft 88. It will be recalled that this shaft 88 (Fig. 12) is driven through the clutch 27 by the gears 84 and 87, and drives the platen. It rotates in counterclockwise direction with reference to Figs. 15 and 16.

The cam 92 (Fig. 16) cooperates with the follower 93 on the link 41, and the cam 91 cooperates with a follower roller 94 on the arm 53 of the three-arm lever 54.

Figure 15:
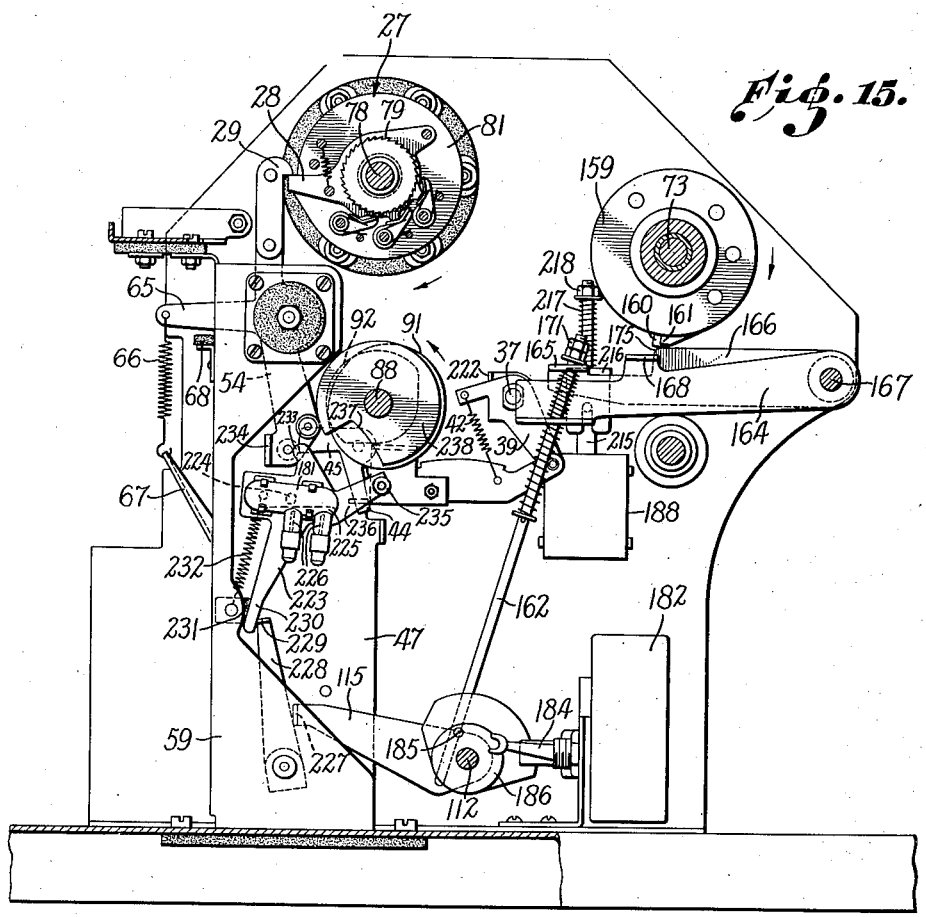
Fig. 15 is a section looking from back to front, the section being taken just back of the main clutch.

It will be observed from Fig. 16 that, immediately after the latch 29 has been tripped to engage the clutch, a rise on the cam 92 begins to bear against the follower 93, and continued movement carries the left end of the link 41 downwardly, clear of the lower arm 44 of the bellcrank 45. Thereafter, the link 41 is ineffective to prevent counterclockwise return of the bellcrank 45 by the torsion spring 48, but such return is prevented by the fact that the roller 52 is blocking downward movement of the arm 50. Continued rotation of the shaft 88 carries the high part of the cam 91 against the roller 94, which swings the lever 54 back into normal position, against the force of the spring 66 (Fig. 15). During this return movement of lever 54, the cam 92 (Fig. 16) maintains the link 41 in lower position, clear of the arm 44, so that as soon as the restoring movement of the lever 54 carries the roller 52 out from under the arm 50, the bellcrank 45 is rocked by its spring 48 back into the position shown in Fig. 15. In this position, the end 51 of the arm 50 lies against the roller 52 and blocks return movement of the lever 54. In response to final rotation of the shaft 88 back into the normal position of Fig. 15, the cam 92 releases the follower 93 (Fig. 16). The spring 42 constantly urges the link 41 upwardly, and if the letter trigger has been restored to normal position, then the left end of the link 41 will be clear of the arm 44, and the link will move into the normal position shown in Fig. 15. If the letter trigger has not been restored to normal position at the time the cam 92 is restored to its normal position, then the link 41 will come to rest against the lower end of the arm 44 until such time as the letter trigger is restored, whereupon the link 41 will be retracted to the right until its left end slips past the lower end of the arm 44 under the force exerted by the spring 42.

It will be observed from the foregoing description that the movement of the three-arm lever 54 into clutch-disengaging position is effected by the spring 66, and that the only work that has to be performed by the envelope acting against the trigger arm 10 is that necessary to lift the arm 50 clear of the roller 52 (Fig. 16). The energy required to perform this operation is very slight, because the movement of the arm 50 is substantially perpendicular to the direction of movement of the roller 52. Furthermore, the corner of the arm 50 contacts the roller 52 very near the dead center line between the fulcrum 46 and the center of the roller 52, so that following a very slight initial movement of the arm 50 the force of the spring 66 becomes effective to help in the upward movement of the arm 50.

The spring 66 can be made as heavy as necessary to insure prompt and positive disengagement of the latch 29, because the power for resetting the lever 54 and tensioning the spring 66 is derived from the motor through the cam 91. Of course the power necessary to reset the link 41 is also supplied from the motor through the cam 92.

During operation on envelopes, as described, the tape mechanism is retracted so as not to interfere with the passage of envelopes from the table 7 (Fig. 3) to the printing head 4 and platen 5. The tape mechanism includes as its chief elements a tape chute 100 pivotally supported on a shaft 101 for swinging movement from a lower, or retracted, position, shown in Fig. 3, into an upper, active position as shown in Fig. 5. In the latter position it guidingly supports a tape 102 for movement between the printing head and platen, the feeding of tape being effected by the rotation of the printing head and platen. The tape is drawn from a roll 103, positioned in a tape magazine 104. Further knowledge of the details of the tape mechanism is not necessary to an understanding of the present invention, but reference is made to the copending application of Ryan and Drake, Serial No. 377,418, filed February 5, 1941, on Power-operated printing machine, for a complete disclosure of the tape mechanism.

MECHANISM FOR SELECTIVELY CONDITIONING THE MACHINE FOR LETTER OR TAPE OPERATION

The machine is selectively conditioned for letter or tape operation by moving a shift arm 110 (Figs. 11 and 12), located on the front wall 111 of the machine, approximately below the printing head. This shift arm 110 is secured to a shift shaft 112, which extends rearwardly the full length of the machine, and is journaled in various transverse walls of the machine, as clearly shown in Fig. 12. It has secured to it four crankarms 113, 114, 115, and 116 which operate a plurality of controls next to be described.

*Shifting tape chute*

The crankarm 113 shifts the tape chute. When the shift arm is in extreme clockwise position, the machine is adjusted for letter operation. Under this condition, the crank 113 (Fig. 3) retracts the tape chute 100 into lower inactive position through a link 117. On the other hand, when the shift arm 110 and the shift shaft 112 are rocked counterclockwise, the crankarm 113 is elevated, as shown in Fig. 5, causing the link 117 to move the tape chute 100 into its upper, operative position. Counterclockwise movement of the shaft 112 is limited by engagement of a stop pin 118 on the end of the crank 113 against the link 117. When the chute is in upper, operative position, the pivotal connection 119 between the link 117 and the crank 113 is slightly past the dead-center line between the shaft 112 and the upper link pivot 120, so that the weight of the tape chute tends to retain the shift shaft in counterclockwise position.

*Shifting pressure roller*

The crank 114 (Fig. 12) actuates a link 121 for controlling a pressure roller 122 (Fig. 3) associated with the ejector roll 9. This pressure roller 122 is used when stamping envelopes, but it is not used with tape, and would be in the way when printing on tape. Hence it is mounted for swinging movement, and is released for movement into inoperative position by the link 121, in a manner next to be explained.

The pressure roller 122 is supported on a shaft 123 which is in turn rotatably supported by an arm 124, which arm is in turn pivotally supported on a bracket 125. The arm 124 consists of a plate having an upturned end 126 for guiding envelopes to the roller 122. The plate has ears 127 (only one of which appears in the sectional view of Fig. 3), supporting the shaft 123, and ears 128 engaging a shaft 129, which shaft is also engaged by downturned ears on the bracket 125. A torsion spring 130 wrapped around the shaft 129 urges the arm 124 clockwise to press the pressure roll 122 against the ejector roll 9.

Referring now to Fig. 1, the bracket 125 comprises a front horizontal portion 131, the rear edge of which is connected by a downwardly sloping portion 132 to a rear, flat portion 133, which rests upon a shelf 134 (Fig. 6) supported on the frame of the machine. The portion 133 (Fig. 11) of the bracket 125 is pivotally held against the shelf 134 by a screw 136 for swinging movement between the position shown in Fig. 11, into a position at right angles thereto, as illustrated in Fig. 5.

The swinging bracket 125 is constantly urged counterclockwise about its pivot screw 136 (Fig. 8) by a tension spring 137 which is stretched between a pin 138, extending from the underside of the bracket 125, and an ear 139 on a bracket 140, which is anchored to the frame of the machine. Bracket 140, incidentally, functions as a support for the shelf 134, on which the bracket 125 is pivotally supported by the screw 136. The pin 138 extends downwardly through an arcuate slot 141 in the shelf 134, and the ends of the slot constitute stops limiting the swinging of the bracket 125 to substantially 90°.

During letter operation, the bracket 125 is retained in clockwise position, against the force exerted by the tension spring 137, by a shoulder 142 on an offset ear 143 on the forward end of a lever 144 (Fig. 13), which lever is fulcrumed for vertical movement on the bracket 140 by a rivet 145. The forward end of the lever 144 is urged upwardly by a tension spring 146 stretched between the rear portion of the lever 144 and an ear 147 positioned therebelow.

Figure 4:
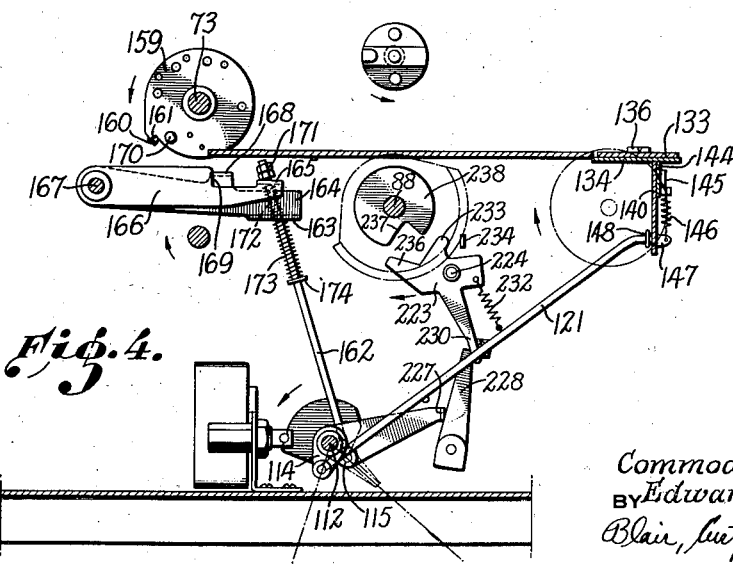
Fig. 4 is a skeleton view in the end of a section, taken approximately along the line IV—IV of Fig. 11.

When the shift shaft 112 (Fig. 12) is rocked counterclockwise to shift the machine into "tape" condition, the lower end of the link 121 is lifted and swung to the right (Fig. 4). The link 121 extends upwardly and to the right, and the outer end thereof is bent substantially horizontally and extended through a vertical slot in the bracket 140, which slot is positioned below the rear end of the lever 144, as shown in Fig. 13. A stop 148 (Fig. 4) on the link limits outward movement of the latter through the vertical slot in the bracket 140, and a cotter pin 149 (Fig. 13), limits inward movement of the link 121 through the slot. Since the outer end of the link 121 is prevented from moving outwardly through the slot, it must move upwardly therealong in response to the rocking of the crank 144 counterclockwise from the position shown in Fig. 4, to the position shown in Fig. 6, and during this upward movement it engages the lever 144 and rocks the rear end of the latter upwardly, and the forward end of it downwardly, to carry the shoulder 142 below the level of the bracket 125 (Fig. 13). This releases the bracket and permits the spring 137 to swing it from the "letter" position shown in Figs. 3 and 4, into the "tape" position shown in Figs. 5 and 6.

The bracket 125 must be restored to "letter" position manually, and if, prior to such manual restoration, the shift shaft 112 has been moved into "letter" position, the bracket will be retained in "letter" position by the shoulder 142.

*Conveyer drive*

It has previously been indicated that the conveyer belts 6 and 8 (Fig. 1) operate continuously whenever the electric motor is running, during letter operation. The details of the conveyer mechanism constitute a separate invention fully disclosed in our above-noted co-pending application, Serial No. 413,120, filed Oct. 1, 1941, on Mail treating machine. It is sufficient for an understanding of the present invention to know that the conveyer belts 6 and 8 are driven through two shafts 150 (Fig. 12) and 151, respectively. The shaft 150 (Fig. 11) is coupled at its rear end to the shaft 73, on which the pulleys 72 and 74 are rotatably mounted. There is also secured to the shaft 73 for rotation therewith, a gear 152 which meshes with a gear 153 positioned therebelow and keyed to a shaft 154 (Fig. 12), which shaft is coupled at its forward end to the rear end of the shaft 151; therefore, the shafts 150 and 151 operate in unison to drive the conveyer belts 6 and 8, whenever the shaft 73 is rotated. Shaft 73 is adapted to be driven through a clutch 155 (Fig. 11) from a pulley 156 loosely journaled on shaft 73 and driven by a belt 157 from a pulley 158 secured to the pulley 76, which, as previously described, is permanently coupled to the electric motor through the belt 75, pulleys 74 and 72, and the belt 71.

The clutch 155 may be of the type described in our above-noted copending application, Serial No. 399,324, and its specific construction is of no interest in connection with the present invention. Suffice it to say that the clutch includes a driven member 159 (Fig. 4) secured to the shaft 73, and a clutch arm 160 which is rockable through a limited angle from a position in advance of a shoulder 161 on the disc 159, as shown in Fig. 4, into a position flush with the shoulder 161. When the clutch arm 160 is in advance of the shoulder 161, the clutch is engaged, and the disc 159 rotates to drive the conveyer belts. This is the condition for "letter" operation.

When the shift shaft 112 is rocked counterclockwise to adapt the machine for "tape" operation, the crank 115 (Fig. 12) raises a link 162 connected thereto, which link extends at its upper end through a slot provided therefor in an ear 163 (Fig. 4) of an arm 164, and through a hole in an ear 165 of an arm 166. Both arms are freely, pivotally supported on a stationary shaft 167. The arm 164 has an ear 168 adapted to cooperate with the clutch arm 160 and the shoulder 161, and the arm 166 has a shoulder 169 adapted to cooperate with a stop pin 170 on the clutch disc 159. However, when the machine is conditioned for "letter" operation, with the crank 115 in lower position, as shown in Fig. 4, the arms 164 and 166 are held clear of the clutch members by stop nuts 171, screwed onto the upper end of the link 162 and bearing against the ear 165 on arm 166. The arm 164 is yieldably held in a predetermined position with respect to the arm 166 by helical compression springs 172 and 173, on the link 162. Spring 172 is compressed between the ears 165 and 163 on the two arms, and spring 173 is compressed between the ear 163 and a stop 174 on the link 162.

When the shift shaft 112 is rocked counterclockwise to adapt the machine for "tape" operation, as shown in Fig. 6, the link 162 is elevated, carrying the ear 168 against the rim of the clutch disc 159, and when the rotation of the disc carries the clutch arm 160 against the ear 168, the clutch arm is carried back flush with the shoulder 161 on the disc, thereby disengaging the clutch and stopping the disc 159. As the shoulder 161 moves against the ear 168, the pin 170 slips past the corner 175 at the upper end of the shoulder 169, depressing the arm 166 against the force of the spring 172 as it does so. As soon as the pin clears the corner 175, the arm 166 is moved up into the position shown in Fig. 6, in which the shoulder 169 lies against the pin 170 and prevents any reverse movement of the disc 159. The latter is thereafter held in stationary condition until it is again released by downward movement of the arm 164 in response to clockwise rotation of the shift shaft 112 to condition the machine for "letter" operation.

OPERATION TO PRINT ON TAPE

The mechanisms have been described whereby movement of the shifting arm from "letter" to "tape" position elevates the tape chute into active position, releases the pressure roll on the letter-ejecting roller for movement out of the way for tape operation, and disconnects the letter conveyer belts from the motor. Thereafter, the machine can be actuated to print postage on tape by manually depressing a push button 176 (Fig. 1), which is positioned closely adjacent the point of discharge of the printed tape, the path of the tape being immediately above the ejector roller 9 (which is now stationary).

Depression of the push button 176 performs two functions: (1) It engages the main clutch 27 to initiate a printing cycle; (2) it closes a switch to start the motor 69, which switch is automatically opened at the completion of the cycle. It is apparent, therefore, that it is not necessary to have the motor operating continuously when printing postage on tape. However, it is desirable to operate the motor continuously when a considerable number of stamps are to be printed on tape, and provision is made for such operation, when desired.

Figure 18:
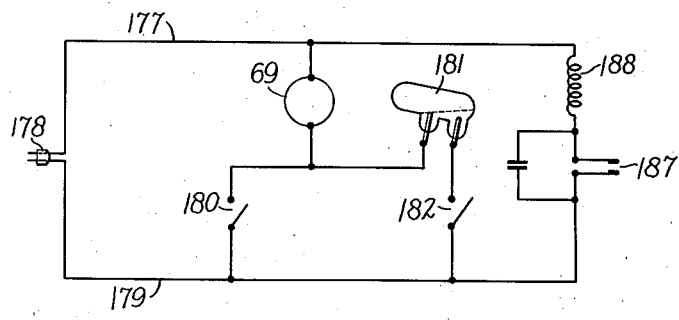
Fig. 18 is a schematic diagram of the electrical circuit of the machine.

The mechanisms actuated under control of the push button 176 will first be briefly outlined with reference to the circuit diagram of Fig. 18, from which it will be observed that the electric motor 69 is adapted to be supplied with current over either of two circuits. Thus one terminal of the motor is permanently connected to one side 177 of an energizing circuit connected to a plug 178, adapted to be plugged into a standard light socket. The other terminal of the motor 69 is adapted to be connected to the other side 179 of the line, either directly through a switch 180, or through a pair of switches 181 and 182 connected in series. The switch 180 is adapted to be manually closed or opened by rocking a starting handle 183 (Fig. 11), mounted on the front wall of the machine to the left of the shift arm 110. This switch 180 is employed, during "letter" operation, as the sole means for starting and stopping the motor 69. It will be recalled that during "letter" operation the motor runs continuously, and the clutch is tripped mechanically to actuate the printing head in response to movement of the trigger 10 (Fig. 3) by envelopes.

The switch 182 is actuated by the shift shaft 112, and is always open when the shift shaft is in "letter" position, and is always closed when the shift shaft is in "tape" position. Thus this switch 182 is positioned near the rear end of the shift shaft 112, as shown in Fig. 12, and is of the toggle type (Fig. 15) having an arm 184 which is in upper position (as shown in Fig. 15), when the switch is open, and is in a lower position when the switch is closed. This arm 184 has a forked end adapted to be engaged by a crank pin 185 projecting from a hub 186, secured to the shaft 112. When the shaft 112 is rocked into "letter" position, the pin 185 moves upwardly, and moves the switch arm 184 upwardly to open the switch, whereas when the shaft 112 is rocked into "tape" position, the pin 185 moves downwardly past the arm 184 and carries it into lower position, in which the switch is closed.

It will be apparent from the foregoing description that when the machine is adjusted for "letter" operation, the switch 182 is always open, and the motor is started and stopped by manual control of the switch 180. However, when the machine is adjusted for "tape" operation, the switch 182 is always closed so that the motor can be started and stopped by manipulation of the mercury switch 181 (Fig. 18), and this switch is actuated in response to depression of the push button 176 in a manner later to be described. However, the switch 180 can, when it is so desired, be closed during "tape" operation to cause the motor 69 to run continuously.

When the machine is adjusted for "tape" operation, depression of the push button 176 closes (in a manner to be described later) a switch 187, which completes an energizing circuit from the conductors 177 and 179 to a solenoid 188. The solenoid 188 trips the clutch 27 and simultaneously closes the mercury switch 181.

The switch 187 and the mechanism for operating it in response to operation of the push button 176, will now be described with reference to Figs. 5 and 14. As shown in Fig. 5, the push button 176 is mounted on the end of a plunger 196, supported in a guide bracket 197, and normally maintained in outer position by a compression spring 198 surrounding the plunger.

Figure 14:
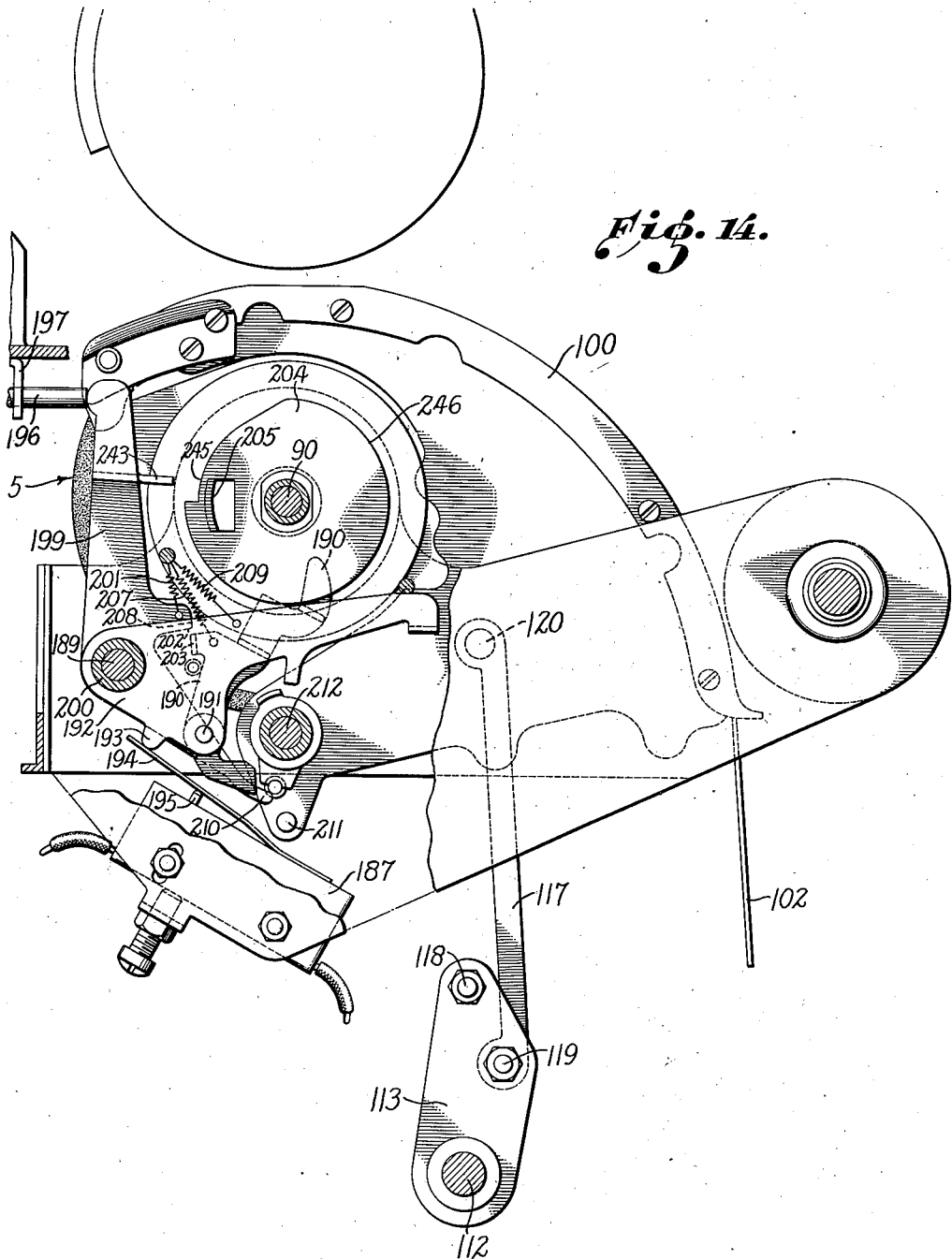
Fig. 14 is a section looking from back to front of the tape chute, and certain control mechanism associated therewith.

Referring now to Fig. 14, the inner end of the plunger 196 bears against the upper end of an arm 199 secured to a sleeve 200 which is rotatably supported on a shaft 189 in the frame that supports the platen 5. The arm 199 is urged counterclockwise against the plunger 196 by a light tension spring 201, and has a shoulder 202 which, when the arm 199 is rocked clockwise by depression of the plunger 196, may engage an ear 203 on an arm 190, pivotally supported by a pivot 191 on an arm 192, which is freely rotatable on the sleeve 200. The arm 192 has a lobe 193 lying against a leaf spring element 194 of the switch 187, the latter having a pin 195 underlying the leaf spring 194 which moves the pin and closes the switch, when depressed. It will be apparent that continued movement of the plunger 196 after the shoulder 202 on arm 199 has contacted the ear 203 on the arm 190, will rock the latter and the arm 192, clockwise, to depress the leaf spring 194 and the switch pin 195, thereby closing the switch 187 to energize the solenoid 188 (as shown in Fig. 18), which, in turn, engages the clutch and closes the switch 181, to start the printing head and platen on a printing cycle.

To prevent the machine from operating through more than one cycle in response to a single depression of the starting plunger 196, the arm 199 is provided with an ear 243, which cooperates with a recessed disc 204, which is secured to the platen shaft 90, for rotation with the platen 5. When the machine is in neutral position (Fig. 14), the ear 243 is juxtaposed to a recess 245 in the periphery of the disc 204, which permits sufficient clockwise movement of the arm 199 to close the switch in the manner already described. However, as the platen rotates (in counterclockwise direction with reference to Fig. 14), the rising portion of the disc bears against the ear 243 and cams the arm 199 outwardly a sufficient distance to open the switch 187, but not sufficiently to disengage the shoulder 202 from the ear 203. Furthermore, at substantially the time when a concentric portion 246 of the disc 204 reaches the ear 243, a lug 205 on the disc 204 engages the upper end of the arm 190 and rocks it clockwise about its pivot 191, to carry the ear 203 out from below the shoulder 202, so that, after the lug 205 has passed the arm 190 and the latter has been restored by a tension spring 207, the ear 203 lies against the end 208 of the shoulder 202, instead of therebelow. This permits the arm 192 to be restored into its full, open-switch position by a tension spring 209. With the switch 187 open (Fig. 18) the solenoid 188 is de-energized, and the machine cannot be started at the end of the cycle, even though the operator maintains a continuous pressure on the starting button. However, if the operator releases the starting button, thereby permitting the arm 199 to be rocked back into its normal position by its spring 201, the end 208 of the shoulder 202 is carried clear of the ear 203 on the arm 190, permitting the latter to be restored into normal position by its spring 207, so that the next time the starting button is depressed, the shoulder 202 on arm 199 will engage the ear 203 and close the switch 187, exactly as previously described.

In order to render the push button inoperative when the machine is conditioned for "letter" operation, the arm 199 is provided with a tail 210 (Fig. 14) which, when the tape chute is moved into lower position, is engaged by a pin 211 on the tape chute, the pin 211 swinging in an arc about a shaft 212 on which the tape chute is pivotally supported for its swinging movement between active and inactive positions. When the tape chute is moved into inactive position, it swings clockwise with respect to Fig. 14, and it will be obvious that this movement will carry the pin 211 into position to intercept the tail 210 and prevent downward movement thereof, thereby limiting movement of the arm 199, and the push button plunger 196, to values insufficient to actuate the switch 187.

The solenoid 188 (Fig. 18) is mounted on one of the transverse wall members 213 (Fig. 11) of the machine, adjacent to and in front of the clutch 27. Referring to Fig. 16, it comprises a coil 214 having a plunger 215, adapted to be drawn downwardly into the coil when the latter is energized. The upper end of plunger 215 (Fig. 17) is of reduced dimensions and extends through a hole in a guide bracket 216 (Fig. 16) so that the latter functions as a stop to limit upward movement of the plunger. A light compression spring 217 surrounds the reduced, upper portion of the plunger and is compressed between the bracket 216 and a stop nut 218 on the upper end of the plunger, to normally retain the latter in upper position. A pin 219 projects from the plunger 215 through a vertical slot 220 in a downwardly projecting portion of the bracket 216, the slot functioning as a guide for the pin to prevent it, and the plunger, from rotating.

The pin 219 overlies an arm 221 which extends between the plunger 215 and the downwardly extending portion of the bracket 216 (Fig. 17). This arm 221 is an extension of a yoke 222 which is rigidly connected to the shaft 37 (Fig. 15) and to the bellcrank 39, which actuates the link 41, previously described. Thus it has been previously explained how rocking of the letter trigger 10 (Fig. 3) rocks the shaft 37 (Fig. 15) and the bellcrank 39. Such rocking movement also rocks the arm 221 (Fig. 16), since there is nothing to restrain the latter from moving downwardly away from the pin 219. The pin simply provides an additional means for rocking the arm 221 and the bellcrank 39 during "tape" operation to engage the clutch 27. Since the operation of engaging the clutch in response to rocking movement of the bellcrank 39 has been previously described in detail, it need not be repeated.

Referring again to Fig. 18, the mechanism for closing the switch 187, and the mechanism whereby the clutch is engaged in response to the energization of the solenoid 188, have been described. There remains to be described the manner in which the mercury switch 181 is closed in response to energization of the solenoid 188 during tape operation.

The mounting of the mercury switch 181 is shown in Fig. 15. Thus the bulb of the switch is secured to a plate 223 which is pivotally supported by a screw 224 for oscillatory movement. Fig. 15 shows the plate 223 rocked into closed position, in which a pool of mercury 225 is in contact with a pair of electrodes 226, thereby completing an electric circuit between the electrodes. As shown in Fig. 15, the plate 223 is held in clockwise position, in which the switch is closed, because the view is taken with the shift shaft 112 in "letter" position, in which an ear 227 on the extended end of the crankarm 115 bears against and rocks an arm 228 counterclockwise. The arm 228 has an ear 229 on the upper end thereof that engages an arm 230 on the plate 223 and locks it against a stop member 231.

However, when the machine is adjusted for "tape" operation, the ear 227 is out of contact with the arm 228, and the plate 223 is normally maintained in a counterclockwise position by a tension spring 232, in which position a lobe 233 on the plate 223 bears against an ear 234 on the arm 53 of the three-arm clutch lever 54. In this position of the plate 223, the switch 181 is open.

When the three-arm lever 54 is tripped (in response to depression of the push button), the ear 234 rocks the switch plate 223 into the clockwise position shown in Fig. 15, thereby closing the switch 181 and starting the motor.

As has been previously outlined, the three-arm lever 54 is power-restored by the cam 91 during the printing cycle. Therefore, if no means were provided to prevent it, the spring 232 would open the switch 181 and stop the motor in mid-cycle. The means for preventing such premature opening of the switch 181 includes a roller 235 on an arm 236 of the plate 223. When the machine is adjusted for "tape" operation, and is in neutral position, the roller 235 lies in a recess 237 in the disc 238 on the platen shaft 88.

The initial rocking of the plate 223 by the ear 234 carries the roller 235 out of the recess 237. Before the cam 91 has rotated a sufficient distance to restore the clutch control lever 54, the concentric portion of the disc 238 intercepts the roller 235, and holds the switch 181 in closed position until the end of the cycle, at which time the recess 237 reaches the roller 235, permitting the switch to be restored to open position by the spring 232.

The reason for maintaining the plate 223 in clockwise position, in which the switch 181 is closed, during "letter" operation, is that the motor always runs continuously during "letter" operation, and it would serve no useful purpose to have the switch closed and opened during each printing cycle.

Since it is only in its closed position that the switch mechanism can be rendered mechanically inactive, the switch 182 (Fig. 18) is provided in series with switch 181 for opening the circuit through switch 181 during "letter" operation.

*Support for the postage meter, when tilted*

In accordance with the present invention, the bracket 125 (Figs. 3 and 8) performs a dual function. It has previously been described how this bracket supports the pressure roll 122 in position to cooperate with the ejector roll 9 during "letter" operation, and how the bracket is automatically released to swing through 90° (Fig. 5), to carry the pressure roll 122 clear of the ejector roll 9 during "tape" operation. The bracket 125 performs the additional function of acting as a support for the postage meter 86 when the latter is moved into an adjusting position, as shown in Fig. 7. Thus it will be observed that in Fig. 7 the meter is tilted, and rests against the inclined portion 132, which portion is preferably padded to avoid marring the surface of the meter.

The meter is locked in position during operation, and must be unlocked before it can be tilted, as shown in Fig. 7. The locking and unlocking operations are performed by swinging a locking lever 239, and, in accordance with the present invention, we provide a connection between the latch lever 144 (Fig. 8) and the locking lever 239, so that movement of the latter into position to unlock the meter automatically rocks the lever 144, to carry the shoulder 142 thereon downwardly out of the path of the bracket 125 and permit the latter to be rocked by the tension spring 137 into the position shown in Figs. 7 and 8.

Thus referring to Fig. 11, the locking lever 239 actuates a crank 240 which shifts a link 241 fore and aft and the link actuates a lever 242 fulcrumed at 244 below the bed plate 247 on which the meter rests. The meter has lockpins 248 which extend into elongated, tapered opening 249 in the bed plate, and when the meter is in locked position, the pins 248 are in the small ends of the openings 249, as shown in Fig. 11. The meter is held in this position by engagement of the arm 242 against a pin 250 on the meter. Before the meter can be tilted, the arm 242 must be swung away from the pin 250 by rocking the handle 239. This rocks the outer end of the arm 242 toward the front of the machine, and carries an extension 250' on the arm under the sloping rear end of the lever 144 to lift the latter and thereby drop the shoulder 142 clear of the bracket 125.

The meter is hingedly supported for swinging movement into the tilted position shown in Fig. 7, by a sheet metal bracket 251, in the lower right-hand corner of which the meter rests. As shown to best advantage in Fig. 19, this bracket consists of a straight plate 252 adapted to engage the side wall of the meter, a pair of ears 253 adapted to extend under the meter, and a pair of bent lugs 254 having reduced end portions 255 adapted to extend through openings 256 (Fig. 9) provided therefor in the bed plate on which the meter is supported. Shoulders 257 are provided on the lugs 254 (Fig. 19) at the junction of the large and reduced portions, and are wider than the holes 256 (Fig. 10) so that the weight of the meter is transferred from these shoulders to the bed plate when the meter is in the tilted position.

It will be observed that the hinge axis defined by the line of contact of the shoulders 257 of the lugs 254 with the bed plate is offset from the lower right-hand corner of the meter. This offset is purposely provided as it results in raising of the lower right-hand corner of the meter above the bed plate when the meter is shifted into tilted position (Fig. 7), and shifts the center of gravity so that the meter moves over "dead center" slightly before it comes to rest against the inclined portion 132 of the bracket 125.

When meter 86 is in the tilted position shown in Fig. 7 it is in a condition of substantially stable equilibrium. However, a shock or jar exerted on the meter to the left, as viewed in this figure, would readily tilt it from its stable position, causing the meter to fall against the table on which it is supported when attached to the mail treating machine, and such a fall might well damage the meter or the machine, or might injure the operator of the machine. Accordingly to prevent such an occurrence, we provide a supporting arm 300, pivoted as at 301 to the machine, and having at its other end a felt-lined shoulder 302 which may be swung to the position shown to prevent the meter inadvertently tipping over. Preferably we provide stop pins 303 and 304, the former of which limits the downward movement of arm 300 so that the arm may not fall out of position, and the latter of which prevents counterclockwise swinging of the arm into an inaccessible position (see also Fig. 5).

Although for the purpose of explaining the invention specific embodiments thereof have been described in substantial detail, it is to be understood that various changes may be made in the particular constructions shown without departing from the invention, which is to be limited only as set forth in the appended claims.

We claim:

1. A machine of the type described, for selectively printing either on separate objects fed thereto, or on tape, comprising: a printing mechanism, means for feeding objects thereto, means for driving said printing mechanism, a tape mechanism for conducting tape to said printing mechanism, said tape mechanism being movable into and out of operative relation with respect to said printing mechanism, ejector means associated with said printing mechanism for discharging said separate objects from the machine after they have been printed, guide means for guiding said objects against said ejector means, means supporting said guide means for movement between a first position in operative relation with respect to said ejector means, and a second position clear of said ejector means to facilitate discharge of tape from said printing mechanism, a manually operated shifting means for shifting said tape mechanism into and out of operative relation with said printing means, and means responsive to movement of said shifting means for moving said guide means out of operative relation with said ejector roller when said tape mechanism is shifted into operative position.

2. Apparatus as described in claim 1, including spring means for constantly urging said guide means into inoperative position, latch means for retaining said guide means in operative position, and means responsive to movement of said shifting means for releasing said latch.

3. In a postage printing machine, a base member including a platen, a postage meter having a printing head and adapted to be locked on said base member with its printing head in operative relation with said platen, locking means movable between a lock position in which it locks said meter in operative position on said base, and a release position in which it releases said meter for separation from said base, auxiliary meter-supporting means for supporting said meter for swinging movement upwardly and laterally with respect to said base, a rest for engaging said meter and restricting said swinging movement thereof, means supporting said rest for swinging movement between a first position in which it is adapted to support said meter, into a second position out of supporting relation with said meter, and means responsive to movement of said locking means into position to release said meter for swinging said rest into position to support said meter.

4. In a postage printing machine, a base member, a postage meter adapted to be supported on said base member and having a bottom surface shaped to fit against said base member when the meter is in normal operating position, means for supporting said meter in tilted position above said base member including an angle bracket engageable with one bottom corner of said meter, means pivotally supporting said bracket for swinging movement about an axis parallel to but horizontally offset away from said corner of the meter when the latter is engaged by said bracket, and stop means for limiting upward and lateral swinging movement of said meter about said axis.

5. In a postage printing machine, a base member, a postage meter adapted to be supported on said base member and having a bottom surface shaped to fit against said base member when the member is in its normal operating position, means for supporting said meter in tilted position with respect to said base member including an angle bracket engageable with one bottom corner of said meter, means pivotally supporting said bracket for swinging movement about an axis parallel to one corner of said meter and to the plane of said base member, and stop means for limiting upward and lateral swinging movement of said meter about said axis.

6. In a postage printing machine, a base member, a postage meter adapted to be supported on said base member and having a bottom surface shaped to fit against said base member when the member is in its normal operating position, means for supporting said meter in tilted position with respect to said base member including an angle bracket engageable with one bottom corner of said meter, means pivotally supporting said bracket for swinging movement about an axis parallel to one corner of said meter and to the plane of said base member, stop means for limiting upward and lateral swinging movement of said meter about said axis, said meter adapted to be locked on said base member in operative position, locking means movable between lock and release positions in which it respectively locks and releases said meter with respect to said base, and means operable in response to movement of said locking means to its release position for moving said stop means into a position to stop swinging movement of said meter about said axis.

7. Apparatus according to claim 5 in which an arm is pivotally related to said base member and is movable into a position to support said meter against downward lateral swinging movement about said axis from its tilted position to its normal operating position.

COMMODORE D. RYAN.
EDWARD P. DRAKE.